US009826857B2

United States Patent
Shi et al.

(10) Patent No.: US 9,826,857 B2
(45) Date of Patent: Nov. 28, 2017

(54) COFFEE MACHINE WITH A MULTI-CELLULAR CAPSULE SEAT

(71) Applicants: Zhongyu Shi, Zhejiang Province (CN); Shukuo Liu, Zhejiang Province (CN)

(72) Inventors: Zhongyu Shi, Zhejiang Province (CN); Shukuo Liu, Zhejiang Province (CN)

(*) Notice: Subject to any disclaimer, the term of this patent is extended or adjusted under 35 U.S.C. 154(b) by 44 days.

(21) Appl. No.: 15/163,694

(22) Filed: May 25, 2016

(65) Prior Publication Data
US 2017/0303730 A1    Oct. 26, 2017

(30) Foreign Application Priority Data
Apr. 22, 2016   (CN) ........................... 2016 1 0255168

(51) Int. Cl.
*A47J 31/36* (2006.01)
*A47J 31/40* (2006.01)
*A47J 31/06* (2006.01)

(52) U.S. Cl.
CPC ......... *A47J 31/407* (2013.01); *A47J 31/0668* (2013.01); *A47J 31/3628* (2013.01); *A47J 31/3676* (2013.01); *A47J 31/3695* (2013.01)

(58) Field of Classification Search
CPC ................ A47J 31/0668; A47J 31/3623; A47J 31/3628; A47J 31/3676; A47J 31/3695
USPC ...................................................... 99/291, 295
See application file for complete search history.

(56) References Cited

U.S. PATENT DOCUMENTS

| | | | | |
|---|---|---|---|---|
| 6,729,226 B2 * | 5/2004 | Mangiapane | ......... | A47J 31/057 99/289 P |
| 7,325,479 B2 * | 2/2008 | Laigneau | ............ | A47J 31/0647 99/295 |
| 7,673,557 B2 * | 3/2010 | Bienvenu | ............ | A47J 31/3676 99/290 |
| 2015/0246768 A1 * | 9/2015 | Talon | .................. | A47J 31/0668 426/79 |

* cited by examiner

*Primary Examiner* — Reginald L Alexander

(57) ABSTRACT

A coffee machine with a multi-cellular capsule seat having a base, a lower body and an upper body; a multi-cellular capsule seat is provided inside the upper body; at least two coffee capsules are placed side by side inside the multi-cellular capsule seat; a front inner cover is provided on the multi-cellular capsule seat; a right side of the front inner cover is provided with a front inner cover water inlet; the front inner cover water inlet is in communication with a second inlet provided at a middle part of a surface of the second coffee capsule; the second inlet is provided with a second upper piercing pin; a second piercing position seal ring is provided on the second upper piercing pin. The present invention has a simple structure and can double the working capacity, thereby increasing working efficiency.

7 Claims, 3 Drawing Sheets

COFFEE MACHINE WITH A MULTI-CELLULAR CAPSULE SEAT

BACKGROUND OF THE INVENTION

The present invention relates to the technical field of coffee machine, and more particularly relates to a coffee machine with a multi-cellular capsule seat.

Electronic technology is applied to a coffee machine to achieve automatic control of the entire preparation process of a cup of coffee, including grinding, pressing and packing of coffee powder as well as coffee brewing and residue removal. A conventional coffee machine has only one single cell for a capsule, therefore it is disadvantageous of being mono-functional, slow and inefficient.

BRIEF SUMMARY OF THE INVENTION

In view of the aforesaid disadvantages now present in the prior art, the present invention provides a coffee machine with a multi-cellular capsule seat. The present invention has a simple structure, a reasonable design and it is convenient to use. The present invention provides a multi-cellular capsule seat inside the upper body of the coffee machine. The present invention therefore has a simple structure and can double its working capacity, thereby significantly enhancing its working efficiency.

A coffee machine with a multi-cellular capsule seat comprises a base; a lower body is disposed on the base; an upper body is disposed on the lower body; a front portion of the upper body is hinged with a front cover; a front cover button is provided in a middle part of an outer edge of the front cover; a rear portion of the upper body is installed with a rear cover; a multi-cellular capsule seat is provided inside the upper body; at least two coffee capsules are placed side by side inside the multi-cellular capsule seat; the two coffee capsules comprise a first coffee capsule and a second coffee capsule; a front inner cover is provided on the multi-cellular capsule seat; a right side of the front inner cover is provided with a front inner cover water inlet; the front inner cover water inlet is in communication with a second inlet provided at a middle part of a surface of the second coffee capsule; the second inlet is provided with a second upper piercing pin; a second piercing position seal ring is provided on the second upper piercing pin; a bottom inner side of the second coffee capsule is provided with a second lower piercing pin; a first upper piercing pin is provided at a first inlet positioned at an upper surface of the first coffee capsule; a first piercing position seal ring is provided at the first upper piercing pin; a control valve is provided on the first inlet of the first coffee capsule; the control valve comprises a control valve cavity on the first inlet, a control valve cover provided on the control valve cavity, a control valve piston rod provided in the control valve cavity, a piston spring provided on the control valve piston rod, and a piston seal ring disposed between the control valve cavity and the control valve cover; a bottom inner side of the first coffee capsule is provided with a first lower piercing pin; in the upper body, a water inlet opening is provided at a left side of the multi-cellular capsule seat; a water outlet seal ring is provided on the water inlet opening; the control valve is connected with a second connecting water pipe; the second connecting water pipe is connected with a first opening of a three way water pipe connector; another two openings of the three way water pipe connector are connected with a first connecting water pipe and a third connecting water pipe respectively; the first connecting water pipe and the third connecting water pipe are connected with the water inlet opening and the front inner cover water inlet respectively.

Further, an upper portion of the lower body is provided with a water level measurement ruler.

Further, a bottom right side of the lower body is provided with a drip tray; a drip tray cover is provided on the drip tray.

Further, an audio device is provided at a middle portion of the base.

Further, a Bluetooth™ PCB board and a USB charging board are provided inside a left side of the base.

Further, a front decorative strip is provided at a middle portion of a front surface of the upper body.

Further, a stainless steel decorative plate is provided at a lower portion of the front surface of the upper body.

Due to the above described structure, the present invention has the following advantages: The coffee machine with a multi-cellular capsule seat as provided by the present invention provides a multi-cellular capsule seat inside its upper body. The present invention has a simple structure and can double its working capacity, thereby significantly enhancing its working efficiency.

BRIEF DESCRIPTION OF THE DRAWINGS

The drawings described herein are only intended for further understanding of the present invention. The drawings constitute a part of the application, but should not be considered limiting.

Figure 1:
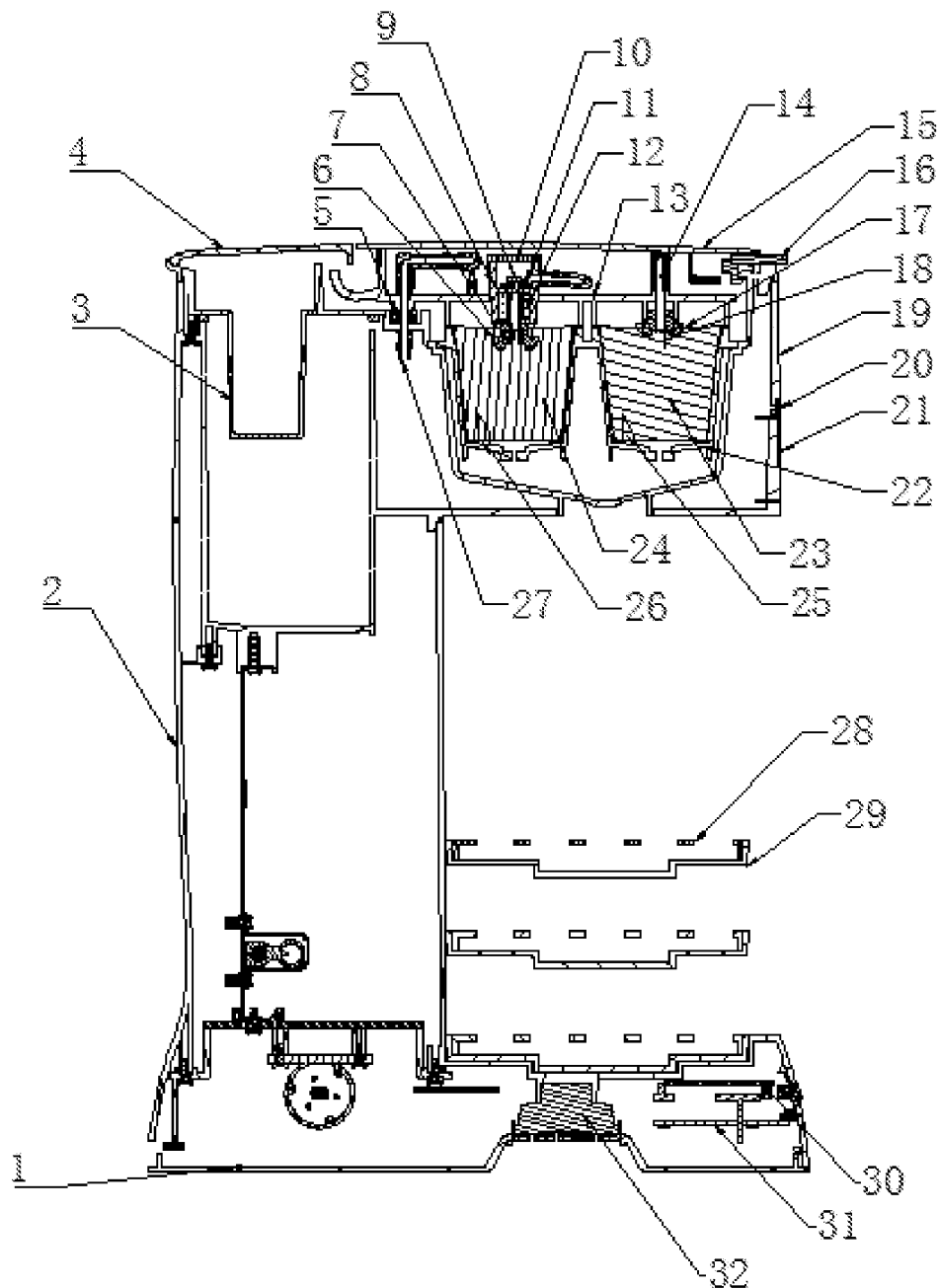
FIG. 1 is a sectional view showing the structure of the present invention.

REFERENCES IN THE FIGURES 1-base; 2-lower body; 3-water level measurement ruler; 4-rear cover; 5-water outlet seal ring; 6-first piercing position seal ring; 7-first upper piercing pin; 8-control valve cavity; 9-control valve piston rod; 10-control valve cover; 11-piston seal ring; 12-piston spring; 13-front inner cover; 14-front inner cover water inlet; 15-front cover; 16-front cover button; 17-second piercing position seal ring; 18-second upper piercing pin; 19-upper body; 20-front decorative strip; 21-stainless steel decorative plate; 22-multi-cellular capsule seat; 23-second coffee capsule; 24-first coffee capsule; 25-second lower piercing pin; 26-first lower piercing pin; 27-water inlet opening; 28-drip tray cover; 29-drip tray; 30-Bluetooth™ PCB board; 31-USB charging board; 32-audio device; 33-first connecting water pipe; 34-second connecting water pipe; 35-third connecting water pipe; 36-three way water pipe connector.

DETAILED DESCRIPTION OF THE INVENTION

The present invention will be described in detail below with reference to the drawings and an embodiment. The illustrative embodiment and its associated description are only intended to explain the present invention, and should not be considered limiting to the present invention.

Figure 2:
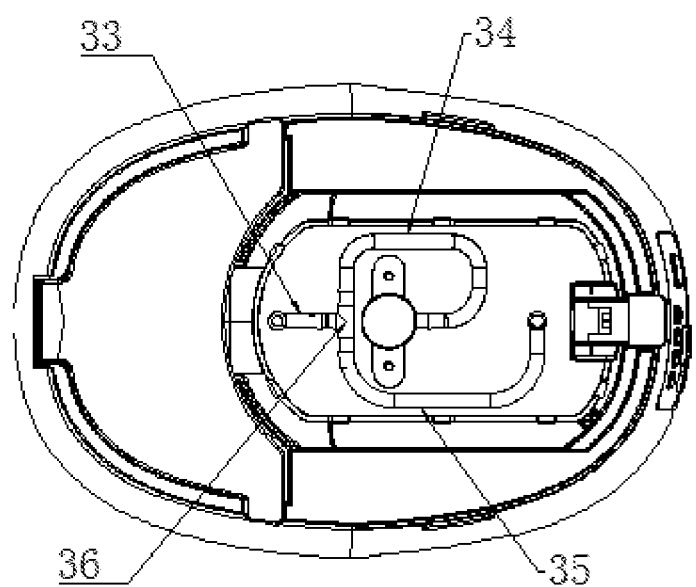
FIG. 2 is a top plan view showing the structure of the present invention.
Figure 3:
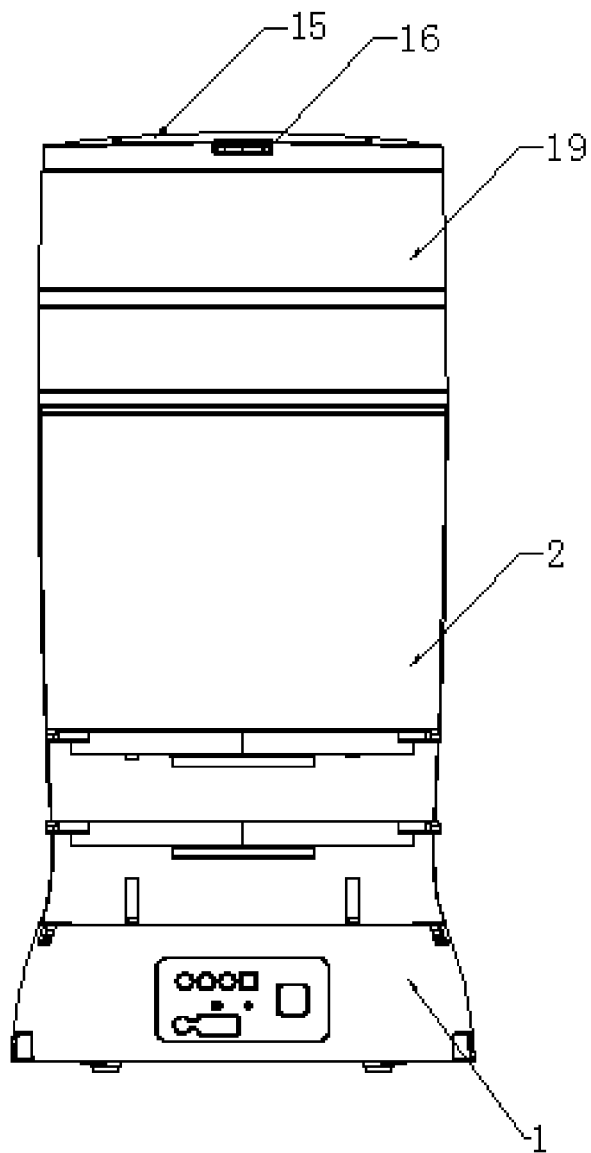
FIG. 3 is side view showing the structure of the present invention.

As shown in FIGS. 1-3, a coffee machine with a multi-cellular capsule seat according to the present embodiment comprises a base 1. A lower body 2 is disposed on the base 1. An upper body 19 is disposed on the lower body 2. A front portion of the upper body 19 is hinged with a front cover 15.

A front cover button 16 is provided in a middle part of an outer edge of the front cover 15. A rear portion of the upper body 19 is installed with a rear cover 4.

A multi-cellular capsule seat 22 is provided inside the upper body 19. At least two coffee capsules are placed side by side inside the multi-cellular capsule seat 22. The two coffee capsules comprise a first coffee capsule 24 and a second coffee capsule 23. A front inner cover 13 is provided on the multi-cellular capsule seat 22. A right side of the front inner cover 13 is provided with a front inner cover water inlet 14. The front inner cover water inlet 14 is in communication with a second inlet provided at a middle part of a surface of the second coffee capsule 23. The second inlet is provided with a second upper piercing pin 18. A second piercing position seal ring 17 is provided on the second upper piercing pin 18. A bottom inner side of the second coffee capsule 23 is provided with a second lower piercing pin 25.

A first upper piercing pin 7 is provided at a first inlet positioned at an upper surface of the first coffee capsule 24. A first piercing position seal ring 6 is provided at the first upper piercing pin 7. A control valve is provided on the first inlet of the first coffee capsule 24. The control valve comprises a control valve cavity 8 on the first inlet, a control valve cover 10 provided on the control valve cavity 8, a control valve piston rod 9 provide in the control valve cavity 8, a piston spring 12 provided on the control valve piston rod 9, and a piston seal ring 11 disposed between the control valve cavity and the control valve cover 10. A bottom inner side of the first coffee capsule 24 is provided with a first lower piercing pin 26.

In the upper body 19, a water inlet opening 27 is provided at a left side of the multi-cellular capsule seat 22. A water outlet seal ring 5 is provided on the water inlet opening 27.

The control valve is connected with a second connecting water pipe 34. The second connecting water pipe 34 is connected with a first opening of a three way water pipe connector 36. Another two openings of the three way water pipe connector 36 are connected with a first connecting water pipe 33 and a third connecting water pipe 35 respectively. The first connecting water pipe 33 and the third connecting water pipe 35 are connected with the water inlet opening 27 and the front inner cover water inlet 14 respectively.

Preferably, an upper portion of the lower body 2 is provided with water level measurement ruler 3.

Preferably, a bottom right side of the lower body 2 is provided with a drip tray 29. A drip tray cover 28 is provided on the drip tray 29.

Preferably, an audio device 32 is provided at a middle portion of the base 1.

Preferably, a Bluetooth™ PCB board 30 and a USB charging board 31 are provided inside a left side of the base.

Preferably, a front decorative strip 20 is provided at a middle portion of a front surface of the upper body 19.

Preferably, a stainless steel decorative plate 21 is provided at a lower portion of the front surface of the upper body 19.

The present invention has the following working principle:

1. Both the first coffee capsule and the second coffee capsule are put into the multi-cellular capsule seat 22, and then close the front cover 15; the first coffee capsule then pushes up the first piercing position seal ring 6 and the control valve piston rod 9 compresses the piston spring 12, so that an upper surface of the first piercing position seal ring 6 seals the control valve cavity 8, and a lower surface of the piston seal ring 11 is separated from the control valve cavity 8; water then enters through the water inlet opening 27 and flows through the water outlet seal ring 5 and the first connecting water pipe 33 to the three way water pipe connector 36 from where the water is diverted to the second connecting water pipe 34 and flows through the control valve cavity 8 and the first upper piercing pin 7 into the first coffee capsule; coffee will then drip out from the first lower piercing pin 26 and then to the multi-cellular capsule seat 22 and finally into a coffee container;

the second coffee capsule is directly sealed against the second piercing position seal ring 17; water entering through the water inlet opening 27 and flowing through the water outlet seal ring 5 and the first connecting water pipe 33 to the three way water pipe connector 36 is also diverted to the third connecting water pipe 35 and then flows through the front inner cover water inlet 14 and the second upper piercing pin 18 into the second coffee capsule; coffee will then drip out from the second lower piercing pin 25 and then to the multi-cellular capsule seat 22 and finally into the coffee container.

2. Only the second coffee capsule 23 is put into the multi-cellular capsule seat 22 while the first coffee capsule 24 is not put into the multi-cellular capsule seat 22; when the front cover 15 is closed, the piston spring 12 and the control valve piston rod 9 reset to their original positions so that the upper surface of the first piercing position seal ring 6 is separated from the control valve cavity 8 while the lower surface of the piston seal ring 11 seals the control valve cavity 8; when water enters through the water inlet opening 27 and then flows through the water outlet seal ring 5 and the first connecting water pipe 33 to the three way water pipe connector 36, water cannot enter the control valve cavity 8 via the second connecting water pipe 34; in this case, as the second coffee capsule 23 is directly sealed against the second piercing position seal ring 17; water entering through the water inlet opening 27 and flowing through the water outlet seal ring 5 and the first connecting water pipe 33 to the three way water pipe connector 36 is diverted to the third connecting water pipe 35 and then flows through the front inner cover water inlet 14 and the second upper piercing pin 18 into the second coffee capsule; coffee will then drip out from the second lower piercing pin 25 and then to the multi-cellular capsule seat 22 and finally into the coffee container.

3. The coffee machine is internally provided with a Bluetooth™ module and equipped with USB charging function.

The coffee machine with a multi-cellular capsule seat as provided by the present invention provides a multi-cellular capsule seat inside its upper body. The present invention has a simple structure and can double its working capacity, thereby significantly enhancing its working efficiency.

The present invention described above is only a preferred embodiment of the present invention. Any other equally effective technical changes or modifications made in accordance with the structure, features and principle disclosed and described within the scope of the present invention should also fall within the scope of the present invention.

What is claimed is:

1. A coffee machine with a multi-cellular capsule seat, comprising a base; a lower body is disposed on the base; an upper body is disposed on the lower body; a front portion of the upper body is hinged with a front cover; a front cover button is provided in a middle part of an outer edge of the front cover; a rear portion of the upper body is installed with a rear cover; a multi-cellular capsule seat is provided inside the upper body; at least two coffee capsules are placed side by side inside the multi-cellular capsule seat; the two coffee capsules comprise a first coffee capsule and a second coffee capsule; a front inner cover is provided on the multi-cellular capsule seat; a right side of the front inner cover is provided with a front inner cover water inlet; the front inner cover water inlet is in communication with a second inlet provided at a middle part of a surface of the second coffee capsule; the second inlet is provided with a second upper piercing pin; a second piercing position seal ring is provided on the second upper piercing pin; a bottom inner side of the second coffee capsule is provided with a second lower piercing pin; a first upper piercing pin is provided at a first inlet positioned at an upper surface of the first coffee capsule; a first piercing position seal ring is provided at the first upper piercing pin; a control valve is provided on the first inlet of the first coffee capsule; the control valve comprises a control valve cavity on the first inlet, a control valve cover provided on the control valve cavity, a control valve piston rod provided in the control valve cavity, a piston spring provided on the control valve piston rod, and a piston seal ring disposed between the control valve cavity and the control valve cover; a bottom inner side of the first coffee capsule is provided with a first lower piercing pin; in the upper body, a water inlet opening is provided at a left side of the multi-cellular capsule seat; a water outlet seal ring is provided on the water inlet opening; the control valve is connected with a second connecting water pipe; the second connecting water pipe is connected with a first opening of a three way water pipe connector; another two openings of the three way water pipe connector are connected with a first connecting water pipe and a third connecting water pipe respectively; the first connecting water pipe and the third connecting water pipe are connected with the water inlet opening and the front inner cover water inlet respectively.

2. The coffee machine with a multi-cellular capsule seat according to claim 1, wherein an upper portion of the lower body is provided with a water level measurement ruler.

3. The coffee machine with a multi-cellular capsule seat according to claim 1, wherein a bottom right side of the lower body is provided with a drip tray; a drip tray cover is provided on the drip tray.

4. The coffee machine with a multi-cellular capsule seat according to claim 1, wherein an audio device is provided at a middle portion of the base.

5. The coffee machine with a multi-cellular capsule seat according to claim 1, wherein a Bluetooth™ PCB board and a USB charging board are provided inside a left side of the base.

6. The coffee machine with a multi-cellular capsule seat according to claim 1, wherein a front decorative strip is provided at a middle portion of a front surface of the upper body.

7. The coffee machine with a multi-cellular capsule seat according to claim 1, wherein a stainless steel decorative plate is provided at a lower portion of the front surface of the upper body.

* * * * *